US011213120B2

(12) United States Patent
Gatzemeyer

(10) Patent No.: US 11,213,120 B2
(45) Date of Patent: Jan. 4, 2022

(54) ORAL CARE SYSTEM AND METHOD

(71) Applicant: COLGATE-PALMOLIVE COMPANY, New York, NY (US)

(72) Inventor: John Gatzemeyer, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 161 days.

(21) Appl. No.: 15/350,266

(22) Filed: Nov. 14, 2016

(65) Prior Publication Data

US 2018/0132602 A1 May 17, 2018

(51) Int. Cl.
*A46B 15/00* (2006.01)
*A46B 9/04* (2006.01)
*G09B 19/00* (2006.01)

(52) U.S. Cl.
CPC ............ *A46B 15/0002* (2013.01); *A46B 9/04* (2013.01); *A46B 15/0004* (2013.01); *A46B 15/0006* (2013.01); *A46B 15/0008* (2013.01); *A46B 15/0012* (2013.01); *A46B 2200/1066* (2013.01); *G09B 19/0084* (2013.01)

(58) Field of Classification Search
CPC ............ A46B 15/0002; A46B 15/0004; A46B 15/0006; A46B 15/001; A46B 15/0012; A46B 15/0008
See application file for complete search history.

(56) References Cited

U.S. PATENT DOCUMENTS

| | | |
|---|---|---|
| 5,815,872 A | 10/1998 | Meginniss, III et al. |
| 5,876,207 A | 3/1999 | Sundius et al. |
| 5,894,620 A | 4/1999 | Polaert et al. |
| 5,930,858 A | 8/1999 | Jung |
| 6,314,907 B1 | 11/2001 | Harris et al. |
| 6,326,884 B1 | 12/2001 | Wohlrabe |
| 6,327,734 B1 | 12/2001 | Meginniss, III et al. |
| 6,425,295 B1 | 7/2002 | Meginnis |
| 6,453,497 B1 | 9/2002 | Chiang et al. |
| 6,468,076 B2 | 10/2002 | Kawamura |
| 6,536,068 B1 | 3/2003 | Yang et al. |
| 6,611,780 B2 | 8/2003 | Lundell et al. |
| 6,630,730 B2 | 10/2003 | Grigg |
| 6,685,471 B1 | 2/2004 | Kawamura et al. |

(Continued)

FOREIGN PATENT DOCUMENTS

| | | |
|---|---|---|
| AU | 2001252198 A1 | 9/2002 |
| CN | 204393684 U | 6/2015 |

(Continued)

OTHER PUBLICATIONS

International Search Report and Written Opinion of the International Searching Authority in international Application No. PCT/US2017/061285, dated Feb. 27, 2018.

*Primary Examiner* — Laura C Guidotti

(57) ABSTRACT

In one embodiment, an oral care system may include a toothbrush comprising a physical property, and a programmable processor configured to receive physical property data indicative of the physical property of the toothbrush. The programmable processor may be further configured to determine, based at least in part upon the received physical property data, a suggested brushing routine for a user and/or an evaluation of a brushing session of a user.

8 Claims, 16 Drawing Sheets

(56) References Cited

U.S. PATENT DOCUMENTS

| | | |
|---|---|---|
| 6,735,802 B1 | 5/2004 | Lundell et al. |
| 6,739,012 B2 | 5/2004 | Grez et al. |
| 6,786,732 B2 | 9/2004 | Savill et al. |
| 7,120,960 B2 | 10/2006 | Kilscher et al. |
| 7,264,026 B2 | 9/2007 | Gruber et al. |
| 7,411,511 B2 | 8/2008 | Kennish et al. |
| 7,682,153 B2 | 3/2010 | Hilfinger et al. |
| 7,748,069 B2 | 7/2010 | Dawley |
| 7,774,886 B2 | 8/2010 | Hilscher et al. |
| 7,976,388 B2 | 7/2011 | Park et al. |
| 8,065,164 B2 | 11/2011 | Hwang |
| 8,161,792 B2 | 4/2012 | Schlueter et al. |
| 8,171,591 B2 | 5/2012 | Hall et al. |
| 8,172,574 B2 | 5/2012 | Hilfinger et al. |
| 8,175,840 B2 | 5/2012 | Hwang et al. |
| 8,214,958 B2 | 7/2012 | Pinyayev et al. |
| 8,218,711 B2 | 7/2012 | Neyer |
| 8,256,979 B2 | 9/2012 | Hilscher et al. |
| 8,272,091 B2 | 9/2012 | Hwang et al. |
| 8,332,186 B2 | 12/2012 | Bates et al. |
| 8,337,213 B2 | 12/2012 | Puurunen et al. |
| 8,381,571 B2 | 2/2013 | Wilhelm et al. |
| 8,393,037 B2 | 3/2013 | Iwahori et al. |
| 8,444,416 B2 | 5/2013 | Chenvainu et al. |
| 8,533,892 B2 | 9/2013 | Dabrowski |
| 8,544,131 B2 | 10/2013 | Braun et al. |
| 8,595,882 B2 | 12/2013 | Bax et al. |
| 8,690,579 B2 | 4/2014 | Ikkink et al. |
| 8,744,192 B2 | 6/2014 | Ortins et al. |
| 8,769,758 B2 | 7/2014 | Jungnickel et al. |
| 8,789,227 B2 | 7/2014 | Cook et al. |
| 8,801,763 B2 | 8/2014 | Fish et al. |
| 8,832,895 B2 | 9/2014 | Jungnickel et al. |
| 8,839,476 B2 | 9/2014 | Adachi |
| 8,863,343 B2 | 10/2014 | Iwahori |
| 8,938,839 B2 | 1/2015 | Kitagawa et al. |
| 8,944,813 B2 | 2/2015 | Kotlarchik |
| 8,972,882 B2 | 3/2015 | Berry |
| 9,009,901 B2 | 4/2015 | Doll et al. |
| 9,105,197 B2 | 8/2015 | Meriheinae et al. |
| 9,113,700 B2 | 8/2015 | Bates et al. |
| 9,192,762 B2 | 11/2015 | Doll et al. |
| 9,204,947 B2 | 12/2015 | Bovenkamp et al. |
| 9,223,903 B2 | 12/2015 | Lamb et al. |
| 9,259,302 B2 | 2/2016 | Miller |
| 9,326,594 B2 | 5/2016 | De Vries et al. |
| 9,333,048 B2 | 5/2016 | Li et al. |
| 9,345,408 B2 | 5/2016 | Curry et al. |
| 2003/0115694 A1 | 6/2003 | Pace |
| 2006/0040246 A1 | 2/2006 | Ding et al. |
| 2006/0123570 A1 | 6/2006 | Pace et al. |
| 2007/0027386 A1 | 2/2007 | Such et al. |
| 2007/0105063 A1 | 5/2007 | Pinyayev et al. |
| 2007/0261185 A1 | 11/2007 | Guney et al. |
| 2008/0102953 A1* | 5/2008 | Schultz .............. A63F 13/00 |
| 2008/0256725 A1 | 10/2008 | Emge |
| 2008/0295760 A1 | 12/2008 | Wielstra |
| 2009/0007433 A1 | 1/2009 | Hawes et al. |
| 2009/0038639 A1 | 2/2009 | Yetukuri et al. |
| 2009/0070949 A1 | 3/2009 | Sagel et al. |
| 2009/0143914 A1* | 6/2009 | Cook ............ A46B 15/0002 |
| | | 700/275 |
| 2009/0215015 A1 | 8/2009 | Chu |
| 2009/0241278 A1 | 10/2009 | Lemchen |
| 2009/0271936 A1 | 11/2009 | Walanski et al. |
| 2010/0024143 A1 | 2/2010 | Dickie |
| 2010/0178252 A1 | 7/2010 | Sagel et al. |
| 2010/0269276 A1 | 10/2010 | Faranda et al. |
| 2010/0281636 A1 | 11/2010 | Ortins et al. |
| 2010/0309302 A1 | 12/2010 | Yang |
| 2010/0319145 A1 | 12/2010 | Neyer et al. |
| 2011/0045778 A1 | 2/2011 | Stratmann et al. |
| 2011/0076638 A1 | 3/2011 | Gottenbos et al. |
| 2011/0081628 A1 | 4/2011 | Alden et al. |
| 2011/0229842 A1 | 9/2011 | Bielfeldt et al. |
| 2011/0247154 A1 | 10/2011 | Driesen et al. |
| 2011/0275424 A1 | 11/2011 | Schmid et al. |
| 2011/0294096 A1 | 12/2011 | deCastro et al. |
| 2011/0297565 A1 | 12/2011 | Stratmann et al. |
| 2012/0005898 A1 | 1/2012 | Molema et al. |
| 2012/0151697 A1 | 6/2012 | Farrell et al. |
| 2012/0171657 A1 | 7/2012 | Ortins et al. |
| 2012/0246846 A1 | 10/2012 | Hall |
| 2012/0295216 A1 | 11/2012 | Dykes et al. |
| 2013/0080295 A1 | 3/2013 | Dykes et al. |
| 2013/0091642 A1 | 4/2013 | Dykes et al. |
| 2013/0125326 A1 | 5/2013 | Schmid et al. |
| 2013/0125327 A1 | 5/2013 | Schmid et al. |
| 2013/0166220 A1 | 6/2013 | Bates et al. |
| 2013/0180061 A1 | 7/2013 | Simeth et al. |
| 2013/0188112 A1 | 7/2013 | Vetter |
| 2013/0203008 A1 | 8/2013 | Kressman et al. |
| 2013/0204597 A1 | 8/2013 | Depta et al. |
| 2013/0207575 A1 | 8/2013 | Bax et al. |
| 2014/0022061 A1 | 1/2014 | Apte et al. |
| 2014/0022798 A1 | 1/2014 | Yang |
| 2014/0022917 A1 | 1/2014 | Apte et al. |
| 2014/0022939 A1 | 1/2014 | Apte et al. |
| 2014/0022941 A1 | 1/2014 | Apte et al. |
| 2014/0023060 A1 | 1/2014 | Apte et al. |
| 2014/0033034 A1 | 1/2014 | Patel |
| 2014/0065588 A1 | 3/2014 | Jacobson et al. |
| 2014/0090197 A1 | 4/2014 | Bernhard et al. |
| 2014/0091001 A1 | 4/2014 | Chan et al. |
| 2014/0096331 A1 | 4/2014 | Farrell et al. |
| 2014/0246049 A1 | 9/2014 | Ikkink et al. |
| 2014/0250612 A1 | 9/2014 | Curry et al. |
| 2014/0310900 A1 | 10/2014 | Curry et al. |
| 2014/0324226 A1 | 10/2014 | Cook et al. |
| 2015/0044629 A1 | 2/2015 | Wang et al. |
| 2015/0088538 A1 | 3/2015 | Dykes et al. |
| 2015/0113747 A1 | 4/2015 | May et al. |
| 2015/0134369 A1 | 5/2015 | Sakata et al. |
| 2015/0141774 A1 | 5/2015 | Ogawa et al. |
| 2015/0157122 A1 | 6/2015 | Prescott |
| 2015/0202030 A1 | 7/2015 | Miller |
| 2015/0205279 A1 | 7/2015 | Simeth |
| 2015/0230593 A1 | 8/2015 | Doll et al. |
| 2015/0230898 A1 | 8/2015 | Miller |
| 2015/0230899 A1 | 8/2015 | Vetter et al. |
| 2015/0244773 A1 | 8/2015 | Wang et al. |
| 2015/0257863 A1 | 9/2015 | Gatzemeyer et al. |
| 2015/0297085 A1 | 10/2015 | Simons et al. |
| 2015/0297089 A1 | 10/2015 | Deane et al. |
| 2015/0305626 A1 | 10/2015 | Deane et al. |
| 2015/0305670 A1 | 10/2015 | Spruit et al. |
| 2015/0313353 A1 | 11/2015 | Schmalhurst et al. |
| 2015/0320531 A1 | 11/2015 | Van Gool et al. |
| 2015/0330966 A1 | 11/2015 | Drake et al. |
| 2015/0351883 A1 | 12/2015 | Hwang et al. |
| 2015/0381096 A1 | 12/2015 | Klemm et al. |
| 2015/0381923 A1* | 12/2015 | Wickenkamp et al. ............... H04N 5/783 |
| 2016/0015492 A1 | 1/2016 | Skaanland et al. |
| 2016/0022024 A1 | 1/2016 | Vetter et al. |
| 2016/0022393 A1 | 1/2016 | Yoshida et al. |
| 2016/0022398 A1 | 1/2016 | Vetter et al. |
| 2016/0143718 A1 | 5/2016 | Serval et al. |
| 2016/0235357 A1 | 8/2016 | Ohmer et al. |
| 2016/0242652 A1 | 8/2016 | Van Putten et al. |
| 2016/0270666 A1 | 9/2016 | Vermeulen |
| 2016/0296163 A1 | 10/2016 | Chaudhry et al. |
| 2016/0310248 A1 | 10/2016 | Meerbeek et al. |
| 2016/0317267 A1 | 11/2016 | Meerbeek et al. |
| 2016/0338635 A1 | 11/2016 | Johnson et al. |
| 2016/0343270 A1 | 11/2016 | Zheng et al. |

FOREIGN PATENT DOCUMENTS

| | | |
|---|---|---|
| CN | 204393685 U | 6/2015 |
| DE | 10224043 A1 | 12/2003 |
| DE | 10255722 A1 | 6/2004 |
| IN | 234961 B | 1/2007 |
| IN | 200601965 P1 | 8/2007 |

(56) References Cited

FOREIGN PATENT DOCUMENTS

| | | |
|---|---|---|
| IN | 200804686 P1 | 8/2008 |
| IN | 201204976 P4 | 10/2013 |
| IN | 201306137 P1 | 12/2014 |
| JP | 2001327331 A | 11/2001 |
| JP | 2002181812 A | 6/2002 |
| JP | 2003093416 A | 4/2003 |
| JP | 2006235809 A | 9/2006 |
| JP | 2010172384 A | 8/2010 |
| JP | 04543663 B2 | 9/2010 |
| JP | 2012086022 A | 5/2012 |
| JP | 2014023796 A | 2/2014 |
| KR | 20070103055 A | 10/2007 |
| RU | 2388430 C2 | 4/2009 |
| WO | WO 99/47020 A1 | 9/1999 |
| WO | WO 2008/058817 A1 | 5/2008 |
| WO | WO 2008/060482 A3 | 5/2008 |
| WO | WO 2008/147360 A1 | 12/2008 |
| WO | WO 2009/001295 A1 | 12/2008 |
| WO | WO 2010/134049 A1 | 11/2010 |
| WO | WO 2010/134051 A1 | 11/2010 |
| WO | WO 2012/042493 A1 | 4/2012 |
| WO | WO 2013/084403 A1 | 6/2013 |
| WO | WO 2014/016718 A1 | 1/2014 |
| WO | WO 2014/097022 A1 | 6/2014 |
| WO | WO 2014/097135 A1 | 6/2014 |
| WO | WO 2014/097240 A3 | 6/2014 |
| WO | WO 2015/003939 A1 | 1/2015 |
| WO | WO 2015/092125 A1 | 6/2015 |
| WO | WO 2015/092626 A1 | 6/2015 |
| WO | WO 2015/140340 A1 | 9/2015 |
| WO | WO 2015/177661 A1 | 9/2015 |
| WO | WO 2016/016323 A1 | 2/2016 |
| WO | WO 2016/020780 A1 | 2/2016 |
| WO | WO 2016/020803 A1 | 2/2016 |
| WO | WO 2016/046701 A1 | 3/2016 |
| WO | WO 2016/047793 A1 | 3/2016 |

\* cited by examiner

US 11,213,120 B2

1

ORAL CARE SYSTEM AND METHOD

BACKGROUND

In attempting to improve oral care routines, it is typically left to the individual to select an appropriate toothbrush. The individual is then advised to follow a standard brushing routine of brushing for two minutes total, dedicating about thirty seconds to each quadrant of the dentition. Brushes may vary, however, in their effectiveness at cleaning different regions of the dentition. Further, the effectiveness of a brushing motion can vary depending on the properties of the brush used. The standard two-minute brushing routine does not consider the differing properties of brushes, and the impact of those properties on brushing effectiveness. The ability to account for the properties and effectiveness of a selected toothbrush with respect to an individual's brushing routine and/or a brushing evaluation would therefore be desirable.

BRIEF SUMMARY

Exemplary embodiments according to the present disclosure are directed to oral care systems and methods which adapt a user's brushing routine and/or brushing evaluation to account for one or more physical properties of a selected toothbrush. The oral care system may include an oral care device and a data processing unit. In one embodiment, the data processing unit collects data concerning one or more physical properties of the toothbrush being used, and based on the collected data, the data processing unit determines a suggested brushing routine for the user and/or an evaluation of a brushing session of a user.

In one aspect, the invention can be an oral care system including: a toothbrush having a physical property; and a programmable processor configured to: receive physical property data indicative of the physical property of the toothbrush; and determine a suggested brushing routine based at least in part upon the received physical property data.

In another aspect, the invention can be an oral care system including: a toothbrush comprising a physical property; and a programmable processor configured to: receive physical property data indicative of the physical property of the toothbrush; and determine an evaluation of a brushing session based at least in part upon the physical property data.

In yet another aspect, the invention may be a method for oral care including: receiving, by a programmable processor, physical property data indicative of a physical property of a toothbrush; and determining, by the programmable processor, a suggested brushing routine based at least in part upon the received physical property data.

In still another aspect, the invention may be a method for oral care including: receiving, by a programmable processor, physical property data indicative of a physical property of a toothbrush; and determining, by the programmable processor, an evaluation of a brushing session based at least in part upon the physical property data.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION

Figure 1A:
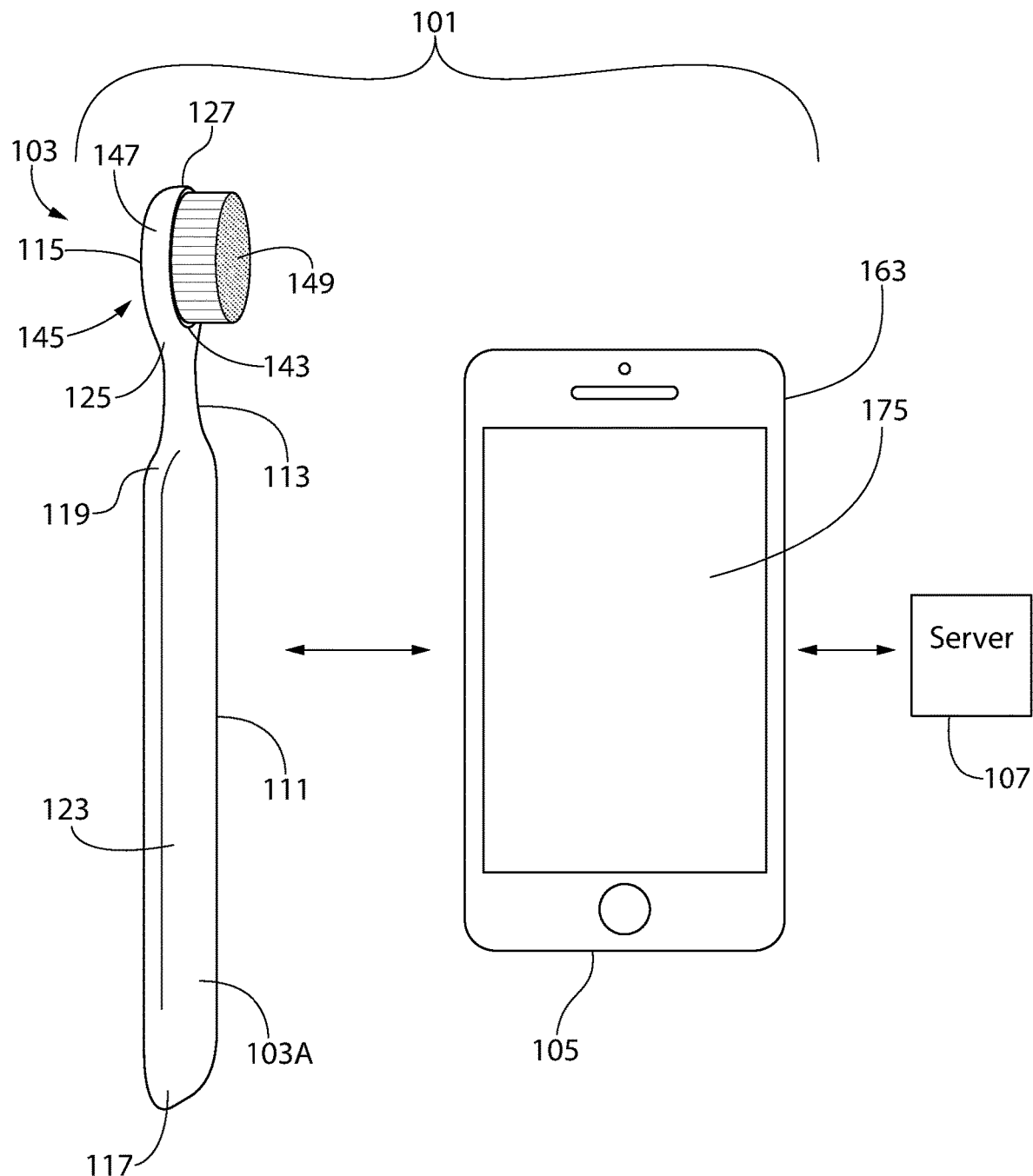
FIG. 1A illustrates an oral care system in accordance with a first embodiment of the present invention, the oral care system being in communication with a server.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Further, as used herein, the phrase "based on" is to be interpreted as meaning "based at least in part on," and therefore is not limited to an interpretation of "based entirely on." Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The programmable processes described herein are not limited to any particular embodiment, and may be implemented in an operating system, application program, foreground or background processes, driver, or any combination thereof. The computer programmable processes may be executed on a single processor or on or across multiple processors.

Processors described herein may be any central processing unit (CPU), microprocessor, micro-controller, computational, or programmable device or circuit configured for executing computer program instructions (e.g. code). Various processors may be embodied in computer and/or server hardware of any suitable type (e.g. desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs is referred to hereinafter as a "programmable device", or just a "device" for short, and multiple programmable devices in mutual communication is referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Turning in detail to the drawings, FIG. 1A illustrates an oral care system 101 in accordance with an embodiment of the present invention. The oral care system 101 includes a toothbrush 103 and a data processing unit 105. The data processing unit 105 may communicate with a server 107 for purposes of storing larger amounts of data or to provide server-side processing functionality. The presence of the server 107 and communication between the data processing unit 105 and the server 107, however, are not limiting of the present invention, unless specifically set forth in a claim.

The toothbrush 103 may be of any type which includes teeth cleaning elements suitable for cleaning teeth. The toothbrush 103 includes at least one physical property, which may be any feature of the toothbrush related to cleaning teeth or to oral care in general. The at least one physical property may be the bristle hardness, the bristle pattern, the bristle profile, the type of teeth cleaning element or elements, the angle of the head with respect to the handle, the flexibility of the material from which all or a part of the toothbrush is constructed, the head size of the toothbrush, the size of the handle, the presence of an oral care additive, whether the toothbrush is manual or electric, the presence of an electrically-powered vibratory element, the presence of an elastomeric element in the bristle field, the presence of a tongue cleaner, the mobility of a first portion of the toothbrush with respect to a second portion of the toothbrush, and the like, amongst many other types of physical properties. Certain physical properties of toothbrushes are discussed further below, and the invention is not limited to any particular physical property of a toothbrush unless specifically set forth in a claim. It is also to be understood, therefore, that the invention is not limited to the toothbrush 103 illustrated as part of the exemplary embodiment.

The toothbrush 103 shown in FIG. 1A generally includes a handle 111, a neck 113, and a head 115. The neck 113 extends between the handle 111 and the head 115 and connects the head 115 to the handle 111. The handle 111 provides the user with a mechanism by which the toothbrush 103 can be readily gripped and manipulated during a brushing session. The handle 111 may be formed of many different shapes, sizes and materials and may be formed by a variety of manufacturing methods that are well-known to those skilled in the art. The handle 111 extends from a proximal end 117 to a distal end 119 to form an elongated gripping portion 123 therebetween. The handle 111 transitions into the neck 113 at the distal end 119. While the neck 113 generally has a smaller transverse cross-sectional area than the handle 111, the invention is not so limited. Broadly speaking, the neck 113 forms a transition region between the handle 111 and the head 115, with the head 115 extending from a proximal end 125 at the end of the neck 113 opposite the handle 111 to a distal end 127. While the head 115 is normally widened relative to the neck 113, in some embodiments the head 115 can simply be a continuous extension or narrowing of the neck 113 and/or handle 111.

The handle 111, the neck 113, and the head 115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 111, the neck 113, and the head 115 of the toothbrush 103 may be formed as a single unitary structure using a molding, milling, machining, or other suitable process. In certain embodiments, the neck 113 may be made from a material which is more flexible than the handle 111 or the head 115, and in such embodiments, the flexibility of the neck 113 provides the head 115 with mobility with respect to the handle 111. Whether the handle 111, the neck 113, and the head 115 are of a unitary or multi-piece construction (including connection techniques) is not limiting of the present invention, unless specifically set forth in a claim. In some embodiments of the invention, the head 115 can have a first portion that is flexibly attached to a second portion of the head 115. During brushing, the first portion can move with respect to the second portion to enhance the brush head's ability to reach certain portions of the denture. In some embodiments of the invention, the head 115 may be detachable (and replaceable) from the handle 111 and/or from the neck 113 using techniques known in the art.

The head 115 generally includes a front surface 143, a rear surface 145 and peripheral side surfaces 147 that extend between the front and rear surfaces 143, 145. The front surface 143 and the rear surface 145 of the head 115 can take on a wide variety of shapes and contours, none of which are limiting of the present invention. For example, the front and rear surfaces 143, 145 can be planar, contoured or combinations thereof.

The front surface 143 of the head 115 includes at least one teeth cleaning element, shown in the exemplary embodiment as a plurality of bristles 149, extending therefrom for cleaning teeth surfaces. As used herein, the term "teeth cleaning element" is used in a generic sense to refer to any structure that can be used to clean or polish the teeth through relative surface contact. In certain embodiments, the head 115 may include a single teeth cleaning element, and in other embodiments, the head 115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 149 of the toothbrush 111 can be connected to the head 115 in any manner known in the art. For example, staples/anchors, in-mold tufting (IMT) or anchor free tufting (AFT) could be used to mount the bristles 149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Figure 1B:
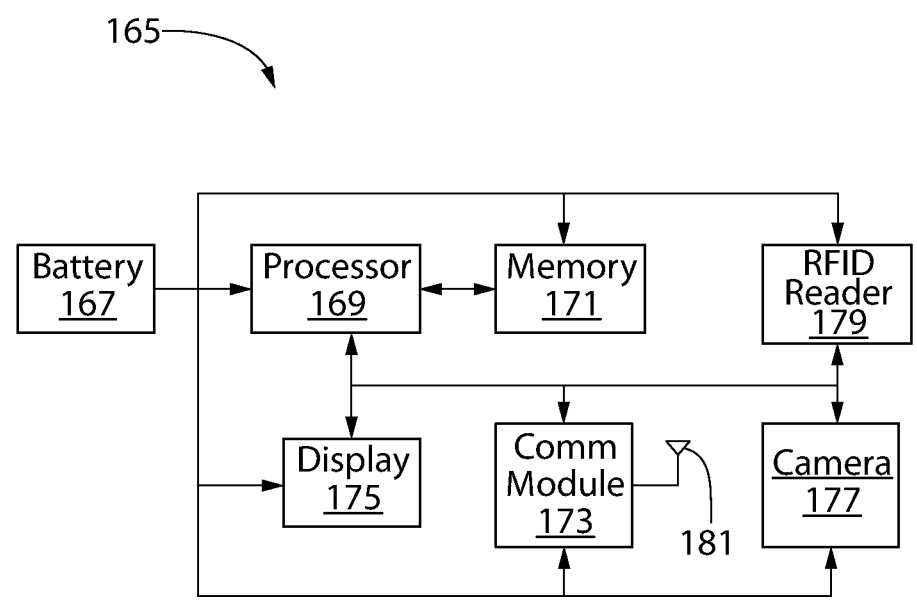
FIG. 1B schematically illustrates electronic components of the data processing unit shown in FIG. 1A.

Referring to both FIGS. 1A and 1B, the data processing unit 105 includes a housing 163 and electronic circuitry 165, with the housing 163 enclosing and/or supporting the various components of the electronic circuitry 165. The electronic circuitry 165 includes a power source, shown as a battery 167 in the exemplary embodiment. Of course, the invention is not so limited, and other types of power sources may be used. The electronic circuitry 165 also includes a processor 169 communicably coupled to a memory 171, a communication module 173, a display 175, an optical imaging subsystem which is shown as a camera 177, and a radio frequency identifier (RFID) tag reader 179.

In certain embodiments, one or both of the optical imaging subsystem 177 and the RFID tag reader 179 may be excluded as optional parts of the electronic circuitry 165. In certain embodiments, the electronic circuitry 165 may include other components, such as a speaker to provide audible feedback to the user, one or more buttons to receive input from the user, and one or more ports for making a wired connection between the electronic circuitry 165 and other circuitry external to the data processing unit 105. In certain other embodiments, the data processing unit 105 may be a smartphone, a tablet computer, a laptop computer, and the like, although the invention is not so limiting. In the exemplified embodiment, the electronic circuitry 165 is located within housing 163 of the data processing unit 105, this housing 163 being separate and distinct from the housing 103A of the toothbrush 103 In other embodiments, the electronic circuitry 165 or certain components thereof may be located within the housing 103A of the toothbrush 103.

The memory 171 may be any appropriate type of memory or storage which enables the processor 169 to perform the desired programming, such as volatile and/or non-volatile random access memory. The particular type of storage used for the memory 171 is not to be limiting of the invention.

The display 175 may be any type of light emitting display, and as shown in the exemplary embodiment, the display 175 may be an LED panel. In certain other embodiments, the display 175 may be an LCD panel, an OLED panel, or any other type of display which is electronically controllable by the programmable processor 169 to provide visual feedback to the user. In certain embodiments, the display 175 may be a touch sensitive display which accepts input from the user directly on the display surface. Such a touch sensitive display may therefore serve as a user interface for the data processing unit 105. The type and configuration of the display 175 is not limiting of the invention unless specifically set forth in a claim. Similarly, the type and configuration of the user interface is not limiting of the invention unless specifically set forth in a claim.

The communication module 173 may include an antenna 181 to enable wireless transmission of communication signals. The communication module 173 may be configured and/or programmed to communicate using a wireless technology standard such as Wi-Fi, Bluetooth®, and the like, or it may communicate using any type of proprietary wireless transmission protocol. The mode of communication for which the communication module 173 is configured is not limiting of the invention unless specifically set forth in a claim. In certain embodiments, the communication module 173 may include a port to enable communications using wires and wired protocols, such as USB and the like.

The communication module 173 of the data processing unit 105 may be configured and/or programmed to communicate with the server 107. The communication module 173 may communicate with the server 107 over any combination of public and/or private network, and the communications may be wired, wireless, or a combination of the two. In certain embodiments, the communication module 173 may communicate with the server 107 over the Internet using one or more types of communication protocols. In certain embodiments, the server 107 may be programmed with one or more application programming interfaces (APIs) which provides server-side functionality to the data processing unit 105.

Figure 2:
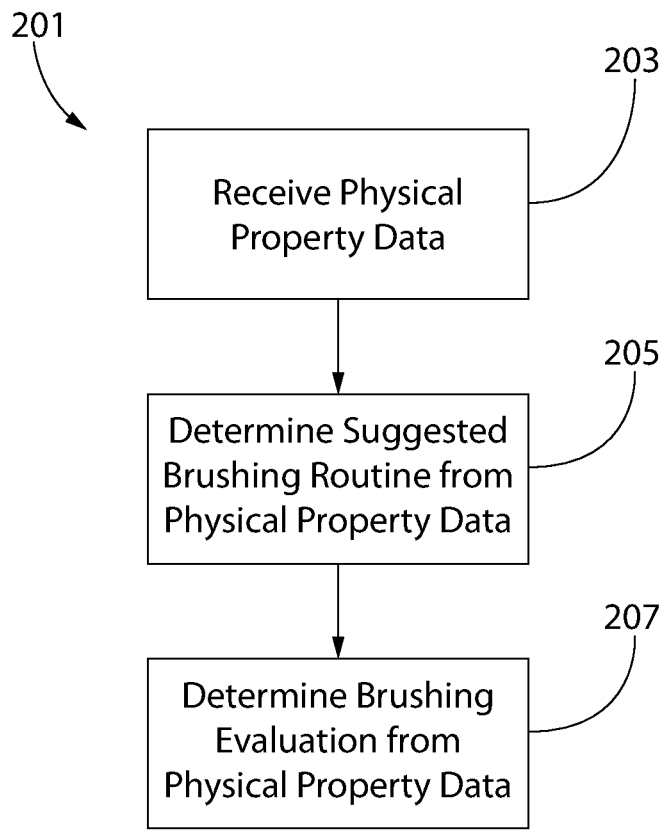
FIG. 2 is a flowchart showing a process for determining a brushing routine and a brushing evaluation from one or more physical properties of a toothbrush in accordance with an embodiment of the invention.

A flowchart 201 showing an exemplary process for determining a suggested brushing routine is shown in FIG. 2. The process of this flowchart 201 may be implemented as programming for the programmable processor 169 of the data processing unit 105. For convenience, as part of the description below, reference will also be made to the hardware components of the data processing unit 105 discussed above in FIG. 1B. While in the exemplified embodiment the processor 169 and other electronic circuitry 165 form part of the data processing unit, the disclosure is not so limited. For example, in other embodiments, a processor forming part of the toothbrush can carry out the steps carried out by processor 169 in the embodiments discussed herein.

The process starts out with a receiving step 203 in which the processor 169 receives physical property data associated with the toothbrush. The physical property data that is received is representative of one or more physical properties of the toothbrush. For purposes of the present disclosure, the term "physical property data" is any type of information indicative of a physical property of a toothbrush, including information extracted or derived from other information or data indicative of a physical property of a toothbrush, regardless of the form of the extracted information. The physical property data may be in the form of mathematical data, analog data, and/or digital data.

As is discussed below, receiving step 203 may be achieved in any number of ways. In certain embodiments, the user may input the physical property data through a user interface of the data processing unit 105. In such embodiments, the data processing unit 105 may use the display 175 to present to the user one or more questions concerning at least one physical property of the toothbrush and then receive the physical property data as answers to the one or more questions. In certain embodiments, the physical property data may be received by the data processing unit by imaging the toothbrush or indicia associated with the toothbrush using the camera 177. In certain embodiments, the physical property data may be received using the RFID tag reader 179. In certain embodiments, the physical property data may be received from the server 107 in response to a toothbrush identifier being transmitted to the server 107 by the data processing unit 105. The toothbrush identifier may be input using any one or more of the user interface, the camera 177, the RFID tag reader 179, and/or any other subsystem that may be included as part of the data processing unit 105. In still other embodiments, one or more of the aforementioned processes for receiving the physical property data may be used in combination.

Following the receiving step 203 is a determining step 205, and in this determining step 205 a suggested brushing routine is determined based upon the received physical property data. This determining step 205 may also be achieved in any number of ways. In certain embodiments, the suggested brushing routine may be determined by presenting the user with a list of potential brushing routines and having the user select the suggested brushing routine from among the list of potential brushing routines. In certain embodiments, the suggested brushing routine may be determined by making adjustments to a standardized brushing time based on the physical property data, as described below. In certain embodiments, the suggested brushing routine may be determined by selecting a predetermined brushing routine based on the physical property data and then adjusting the predetermined brushing routine based on a user brushing history. In such embodiments, the user brushing history may be based upon brushing session data collected from previous brushing sessions of the user. Such brushing session data may be based upon brush stroke, brushing aggressiveness, or upon any other measure of brushing effectiveness. In addition, such brushing session data may be saved in the memory 171 of the data processing unit 105 or in a memory of the server 107. In still other embodiments, one or more of the aforementioned processes for determining the suggested brushing routine may be used in combination.

In the exemplified embodiment, after determining the suggested brushing routine, there is a determination of a brushing evaluation based on the physical property data (step 207). As will be discussed in further detail below, the oral care system 101 can be configured to perform a brushing evaluation of a brushing session of a user. For example, the toothbrush 103 can include sensors, and data derived from the sensors can be used to determine the motion and/or location of the toothbrush. From this determination, the system 101 can determine how well the user brushed his or her teeth. In the exemplified embodiment, this determination is based in part on the physical property data received in step 203. For example, if a user is using a soft-bristled toothbrush, an adequate cleaning of a region may require 20 seconds of brushing. But if a user is using a hard-bristled toothbrush, an adequate cleaning of a region may require only 10 seconds of brushing. In other embodiments, other physical properties and other bases of evaluation can be utilized. For example, a shape of a brush head can inform the system 101 whether a certain brushing motion is effective, and the evaluation can be generated accordingly.

In the foregoing method 201, the physical property data is used to both determine a suggested brushing routine and determine a brushing evaluation. In other embodiments, however, the physical property can be used to determine a suggested brushing routine but not to determine a brushing evaluation, or to determine a brushing evaluation but not to determine a suggested brushing routine.

Figure 3A:
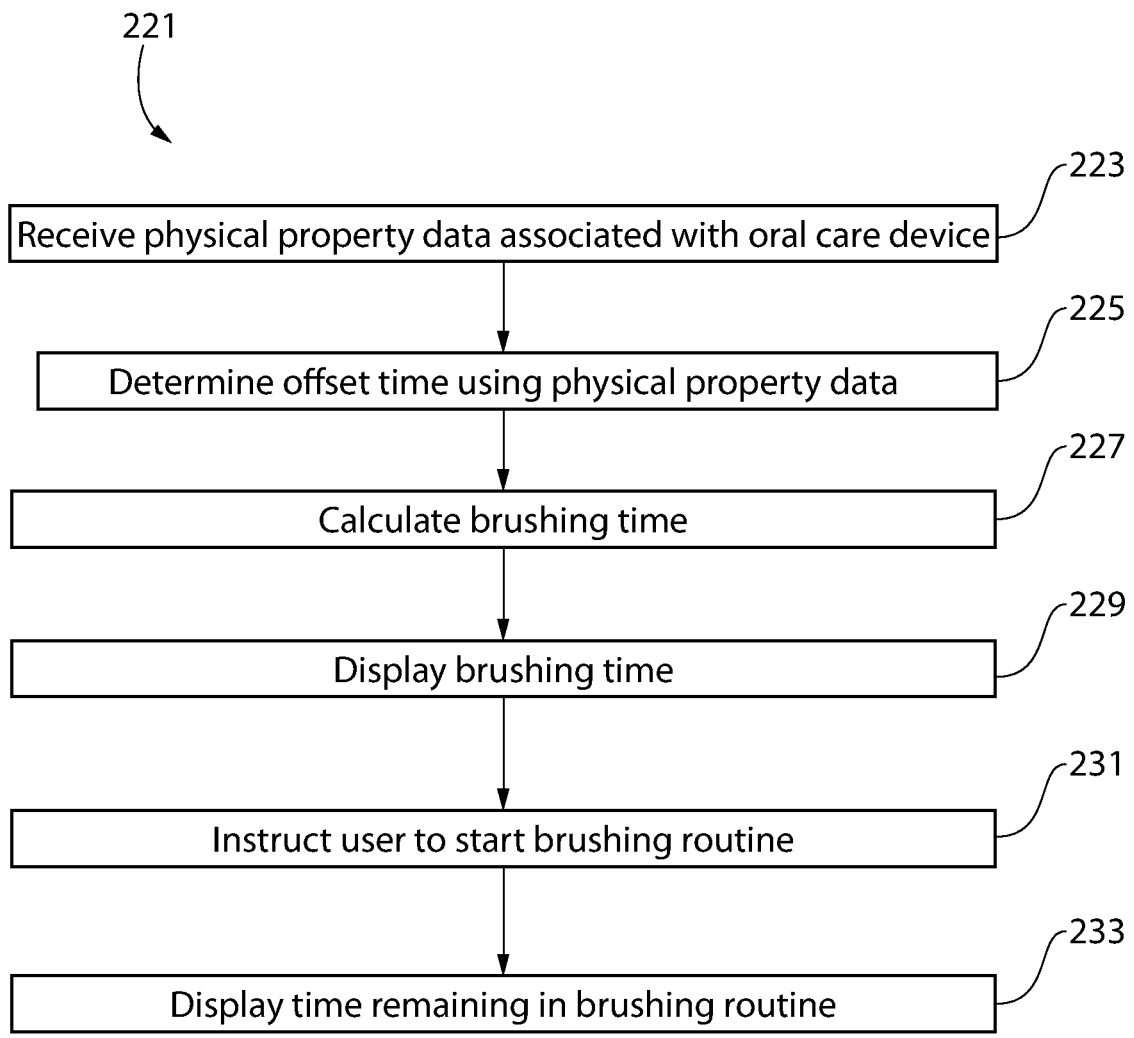
FIG. 3A is a flowchart showing a process for determining a brushing routine from one or more physical properties of a toothbrush in accordance with an embodiment of the invention.

FIG. 3A is a flowchart 221 showing a more detailed version of an embodiment for the process of determining a suggested brushing routine. In the process of this flowchart 221, the suggested brushing routine is determined by adjusting an optimum brushing time based on the received physical property data to determine the brushing time for the suggested brushing routine. The optimum brushing time is predetermined from a standardized brushing routine. In certain embodiments, the standardized brushing routine may be an industry standard brushing routine in which the optimum brushing time is 2 minutes. This process begins with an input step 223 in which the physical property data is received by the data processing unit 105. The physical property data may be received in any one or combination of several different ways as discussed herein. Following the input step 223 is an offset time determining step 225. In this step 225, the data processing unit 105 determines an offset time based on the input physical property data. For example, if the physical property data indicates that the bristles are extra soft, then the offset time may be a positive number. By way of another example, if the physical property data indicates that the bristles are firm, then the offset time may be a negative number. In certain embodiments, the data processing unit may communicate with a server to transmit an identifier for the toothbrush and receive in response the physical property data.

Following the offset time determining step 225 is a brushing time calculation step 227. In this step 227, the brushing time for the brushing routine is calculated. As part of this step 227, the programmable processor 169 of the data processing unit 105 calculates the brushing time by retrieving an optimum time which is stored in the memory 171 and adding the determined offset time to the optimum time. For purposes of the process shown in this flowchart 221, the optimum time represents an established industry standard for brushing effectiveness. As should be apparent, the offset time may increase the brushing time in excess of the optimum time, or the offset time may decrease the brushing time to be less than the optimum time.

After the brushing time calculation step 227 is a displaying step 229. During this step 229, the programmable processor 169 of the data processing unit 105 controls the display 175 to indicate to the user the determined brushing time for the suggested brushing routine. Next, the programmable processor 169 of the data processing unit 105 proceeds to an instruction step 231 in which the user is instructed to begin the suggested brushing routine. In certain embodiments, the processor 169 of the data processing unit 105 may provide other specific instructions for the brushing routine, such as the order for brushing different sections of the user's dentiture, the length of time to brush each section, which section to start with, and the like. When the brushing time has expired, the programmable processor 169 of the data processing unit 105 proceeds to an indication step 233, in which the user is instructed that the brushing routine is at an end.

Figure 3B:
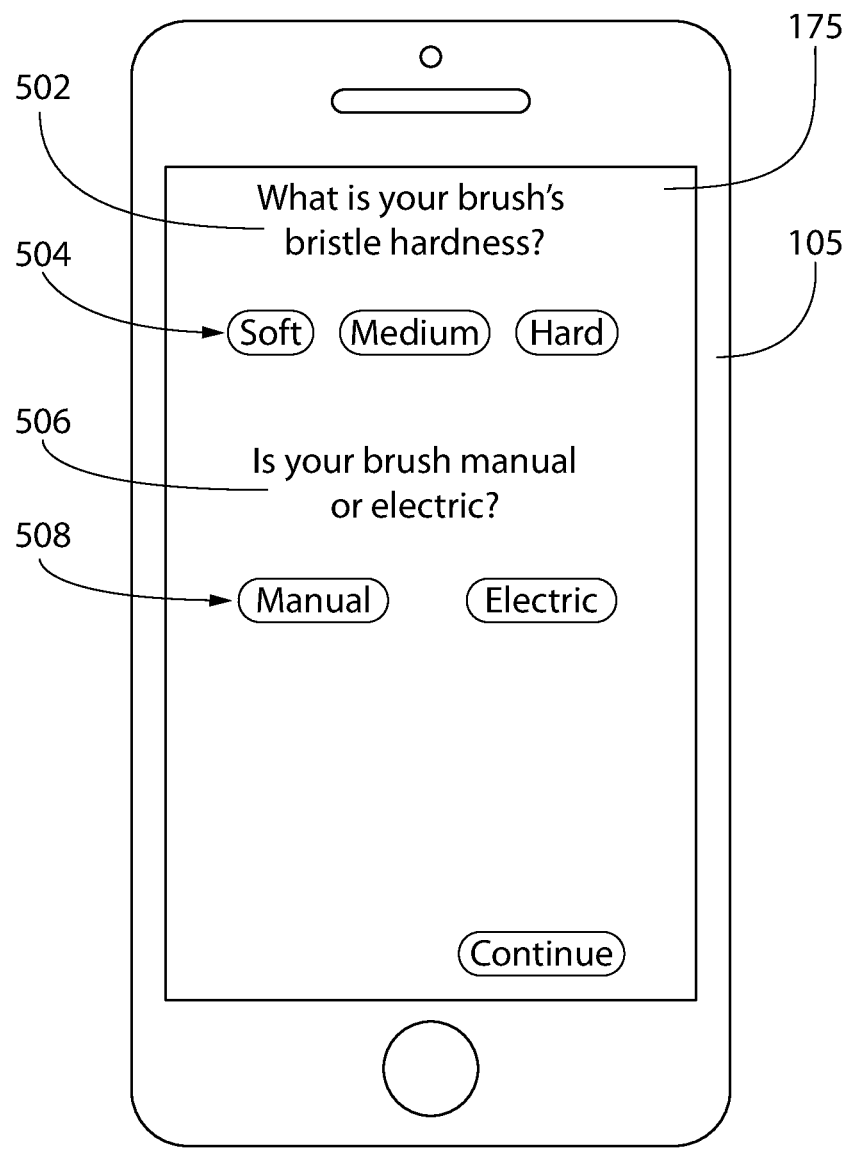
FIG. 3B is illustrates a data processing unit having a user interface whereby a user may input physical property data.

FIG. 3B illustrates a data processing unit 105 having a user interface 175 according to one embodiment. Here, the user may input the physical property data through the user interface 175. In such embodiments, the data processing unit 105 may present to the user using the user interface one or more questions 502, 506 concerning at least one physical property of the toothbrush, and then receive the physical property data as answers 504, 508 to the one or more questions, the answers being received by the user selecting the answers using the user interface. The questions and answers shown are merely exemplary in nature, and any of the physical properties discussed herein (as well as others) can be the subject of a question or answer on a user interface for the purposes of receiving physical property data.

Figure 3C:
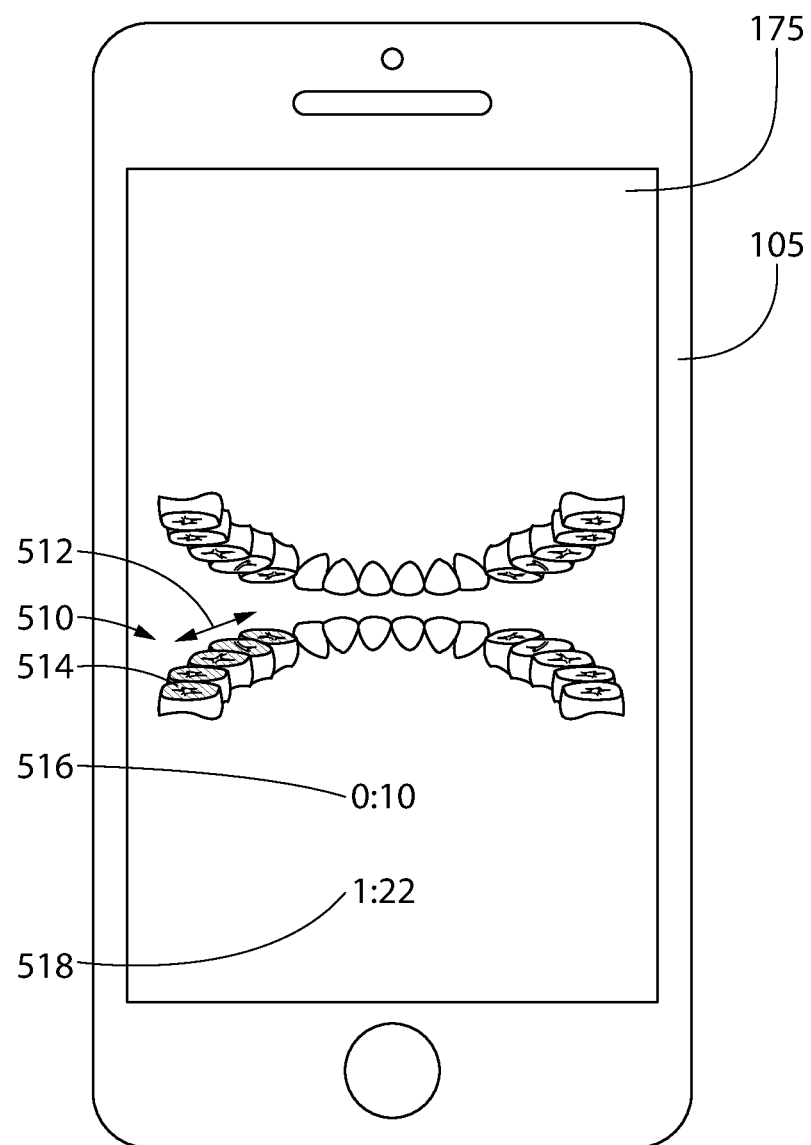
FIG. 3C is illustrates a data processing unit having a user interface providing brushing instructions for a brushing routine.

FIG. 3C illustrates a data processing unit 105 whose user interface 175 can provide brushing instructions 510 for a suggested brushing routine based at least in part on the physical property data received. In this embodiment, the brushing instructions 510 comprise real-time directions for a user to follow during a brushing session. The instructions comprise an indication 514 of a region of the dentiture to brush, an indication 512 of a brushing motion, and an indication 516 of a time remaining for brushing the specified region. In this embodiment, the user interface 175 also provides an indication 518 of the total brushing time remaining in the suggested brushing routine. In this embodiment, different screens may show different instructions as the user progresses through the different stages of the brushing routine, thus coaching the user on which regions to brush, which brushing motions to use, and for how long. In other embodiments, certain indications or instructions can be omitted. Also, other indications or instructions can be added, such as an indication of whether to apply greater or lesser pressure or brushing intensity.

The suggested brushing routine can be determined by adjusting a preexisting brushing routine, the adjustment based at least in part on the physical property data. In other embodiments, the suggested brushing routine need not rely on a preexisting brushing routine.

Figure 3D:
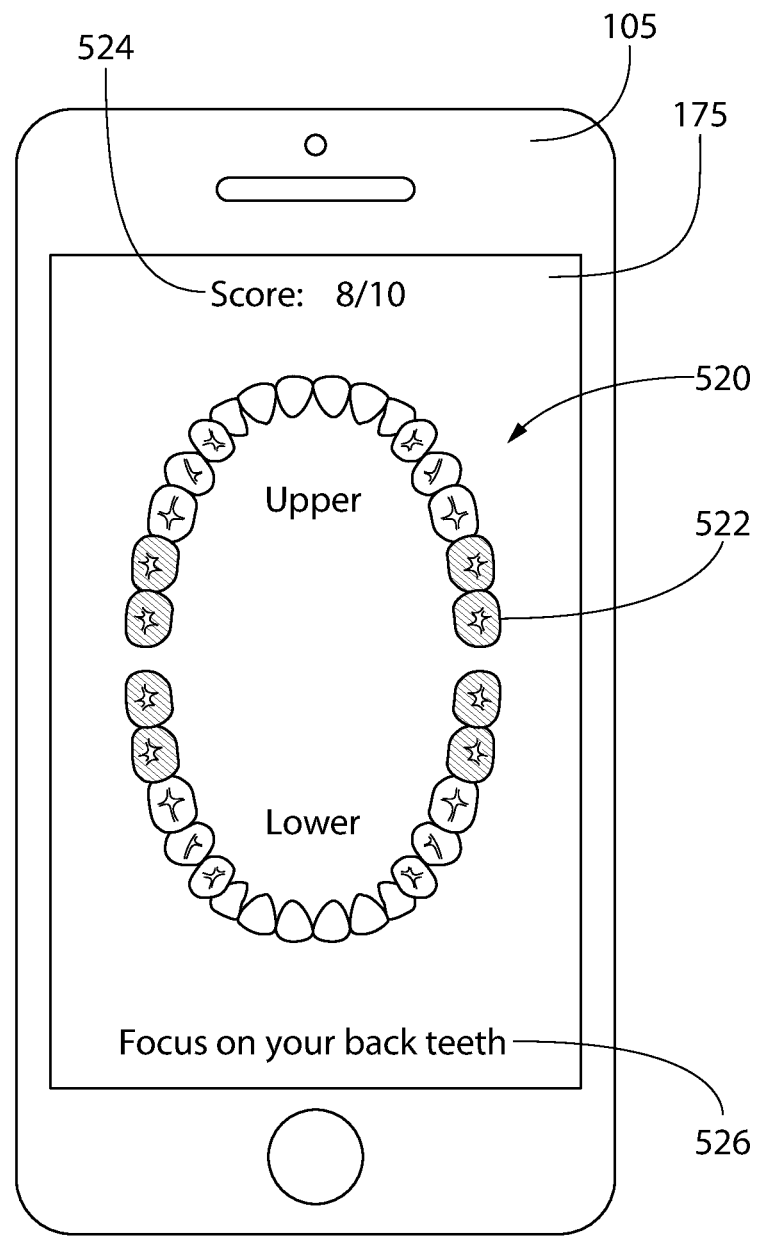
FIG. 3D is a data processing unit having a user interface providing an evaluation of a brushing session of a user.

FIG. 3D illustrates a data processing unit 105 whose user interface 175 can provide an evaluation of a brushing session of a user. In this embodiment, the user interface 175 provides a visualization 520 of the user's dentiture. The dentiture can be divided into different sections, each of which the user is expected to brush during the brushing session. Brushing session data may be collected and processed according to the different portions of the dentiture. The collection of such brushing session data is described in more detail below with respect to FIGS. 11-13.

In the exemplified embodiment, the visualization 520 includes an indication 522 of a region of the dentiture not properly brushed. Further a recommendation 526 provides the user advice on how to improve his or her brushing. The visualization 520 also includes a performance metric 524 that indicates how well the user performed in brushing his or her teeth during the brushing session. In other embodiments, other metrics or visualizations can be used to indicate brushing performance, such as a percentage, or a number of stars (for example, three stars out of five).

Figure 4:
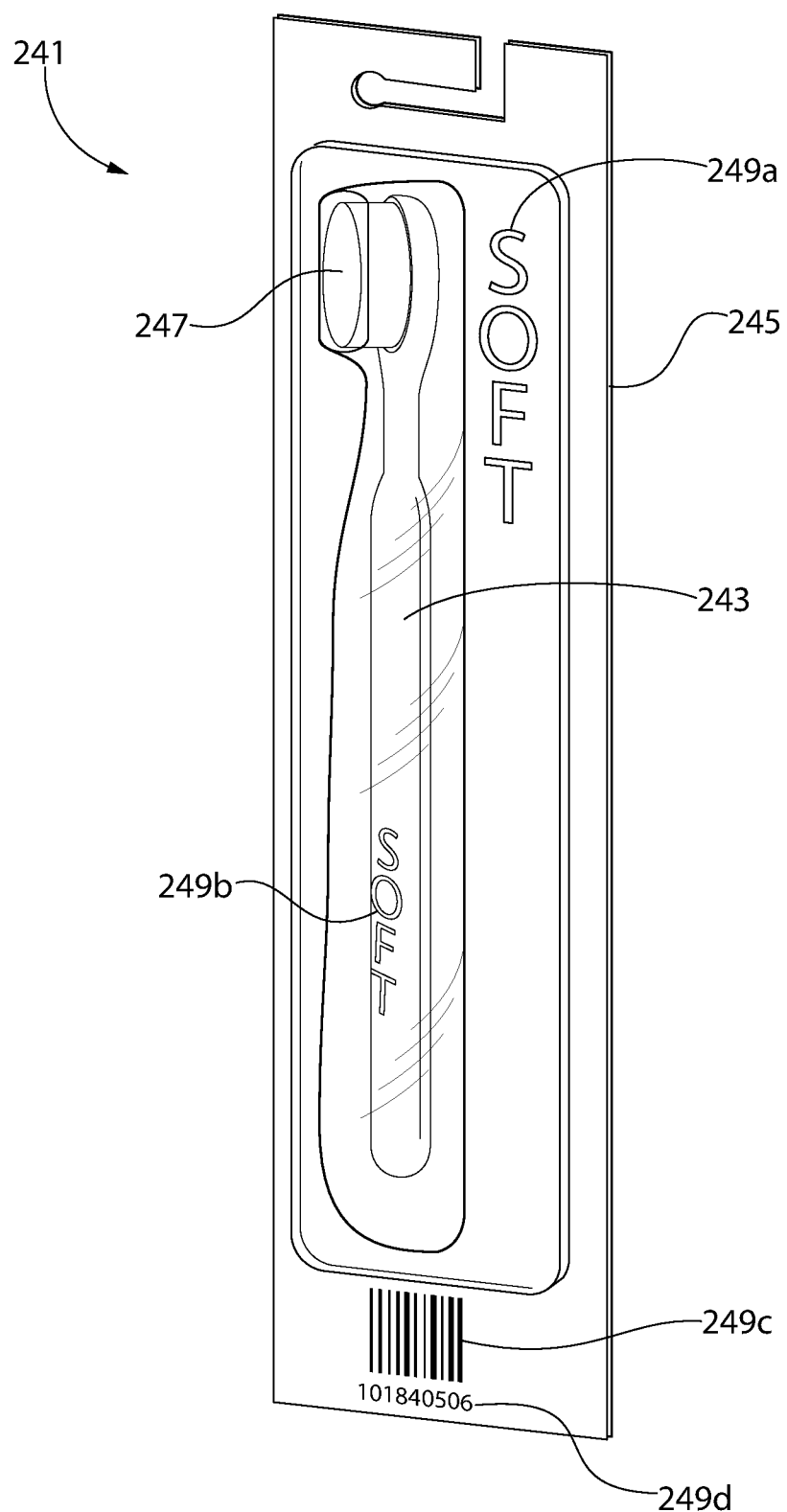
FIG. 4 illustrates a toothbrush in a packaging for use as part of an oral care system in accordance with a third embodiment of the present invention.

FIG. 4 illustrates a commercial product 241 which includes a toothbrush 243 enclosed within a packaging 245. The toothbrush 243 may be any type or style of toothbrush, whether manual or electric, and the toothbrush 243 has at least one physical property which makes it suitable for cleaning teeth. Although the toothbrush 243 is shown in the packaging 245, the packaging 245 is not a required component for the invention.

The toothbrush 243 depicted includes at least one teeth cleaning element, shown in this embodiment as a plurality of bristles 247, and both the toothbrush 243 and the packaging 245 bear an indicia 249a-b indicating a physical property associated with the bristles 247. Specifically, the indicia 249a-b is a word descriptor indicating that the bristles 247 are 'SOFT'. As is typical in the oral care industry, toothbrush bristles are often categorized as 'extra soft', 'soft', 'medium', or 'firm', and these categorizations represent physical properties of the bristles. The categorization of the toothbrush may be input by the user into the data processing unit 105 as the physical property data for the toothbrush. The packaging 245 also bears other indicia 249c-d which can be used to determine the physical property data associated with the toothbrush 247 or parts thereof. One of these indicia 249c is a coded image, which in this embodiment is shown as a barcode. Such a coded image may be imaged by the camera 177 of the data processing unit 105. The coded image may provide the physical property data directly, or it may provide information about a manufacturer and/or model number to enable determination of the physical property data. In certain embodiments, the coded image may be a quick response (QR) code. The other of these indicia 249d is an alphanumeric product identifier, which may also provide information about a manufacturer and/or model number.

The indicia 249a-d may be any type of identifying mark which directly or indirectly represent the at least one physical property of the toothbrush 243 and from which the physical property data may be determined. For indirect representation, the indicia 249a-d may enable the physical property data to be obtained by reference to information stored in the memory 171, from the server 107, or from any public source or database. In certain embodiments, the indicia 249a-d may represent a plurality of physical properties of the toothbrush 243, and the physical properties may be any associated with the toothbrush 243.

Figure 5:
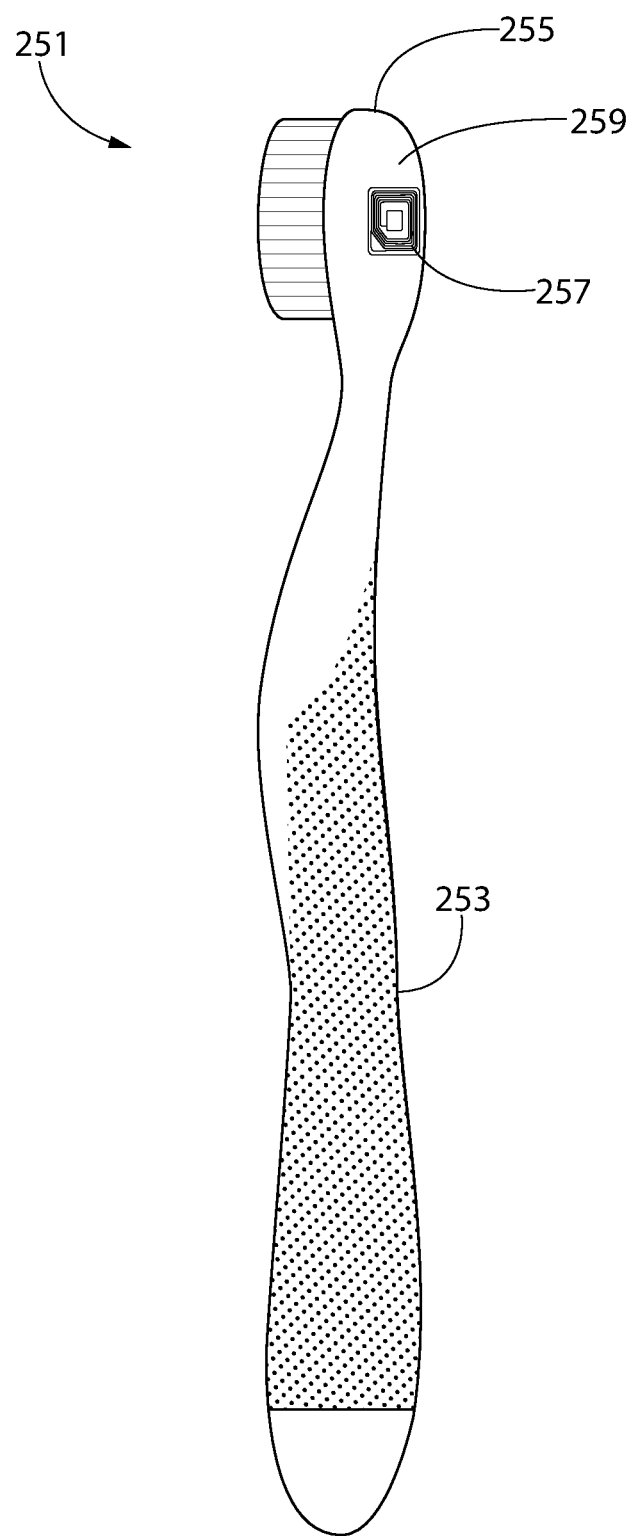
FIG. 5 illustrates a toothbrush having a radio frequency identification (RFID) tag.

A toothbrush 251 having at least one physical property is illustrated in FIG. 5. The at least one physical property may be, for example, the bristle hardness, the bristle pattern, the bristle profile, the type of teeth cleaning element or elements, the angle of the head with respect to the handle, the flexibility of the material from which the toothbrush is constructed, the head size, the size of the handle, the presence of an elastomeric element in the bristle field, the mobility of the head of the toothbrush with respect to the handle of the toothbrush, the mobility of a first portion of the head with respect to a second, different portion of the head, and the like. This toothbrush 251 includes a handle 253 coupled to a head 255 and a radio frequency identifier (RFID) tag 257 positioned on the back side 259 of the head 255. The RFID tag 257 may be detected and by an RFID tag reader 179 included as part of the data processing device 105. In certain embodiments, the RFID tag 257 may store the physical property data and transfer the physical property data to the data processing device 105 when communicating with the RFID tag reader 179. In other embodiments, the RFID tag 257 may communicate an identifier for the toothbrush 251 from which the data processing unit 105 may obtain the physical property data. In such embodiments, the physical processing data may be retrieved from the memory 171, the server 107, or any public source or database using the identifier for the toothbrush 251. Through such processes, the physical property data will be indicative of the at least one physical property of the toothbrush 251.

Figure 6:
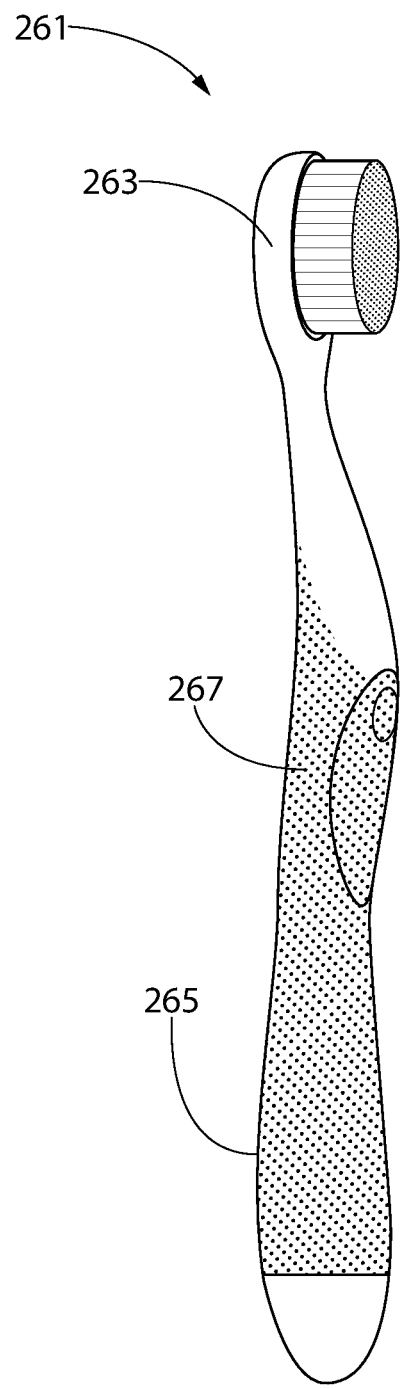
FIG. 6 illustrates a toothbrush having an appearance which may be identified by the data processing unit of FIG. 1B.

A toothbrush 261 having at least one physical property is illustrated in FIG. 6. The at least one physical property may be, for example, the bristle hardness, the bristle pattern, the bristle profile, the type of teeth cleaning element or elements, the angle of the head with respect to the handle, the flexibility of the material from which the toothbrush is constructed, the head size, the size of the handle, the presence of an elastomeric element in the bristle field, the mobility of the head of the toothbrush with respect to the handle of the toothbrush, and the like. This toothbrush 261 includes a head 263 coupled to a handle 265, and the handle 265 includes at least one identifying feature 267. In certain embodiments, the at least one identifying feature 267 may be a decorative feature formed as a pattern, one or more different colors, a profile shape of the toothbrush, and the like. In certain embodiments, the at least one identifying feature 267 may be a distinct look resulting from implementation of a functional feature, such as the bristle pattern, the bristle profile, the presence of a textured grip on the handle 265, and the like. In still other embodiments, the at least one identifying feature 267 may be a combination of a decorative feature and distinct look resulting from implementation of a functional feature. In addition, the at least one identifying feature 267 may be formed on any separate part of the toothbrush 261, or it may extend across multiple parts of the toothbrush 261. In certain embodiments, the identifying feature may be identified by imaging part or all of the toothbrush 261 with the camera 177 of the data processing unit 105 and processing the image with image recognition software on the programmable processor 169 to identify the identifying feature 267. Once the identifying feature 267 is identified, then the programmable processor 169 may use the identification to retrieve the physical property data from the memory 171 or to obtain the physical property data from the server 107. The physical property data will therefore be indicative of the at least one physical property of the toothbrush 261.

Figure 7:
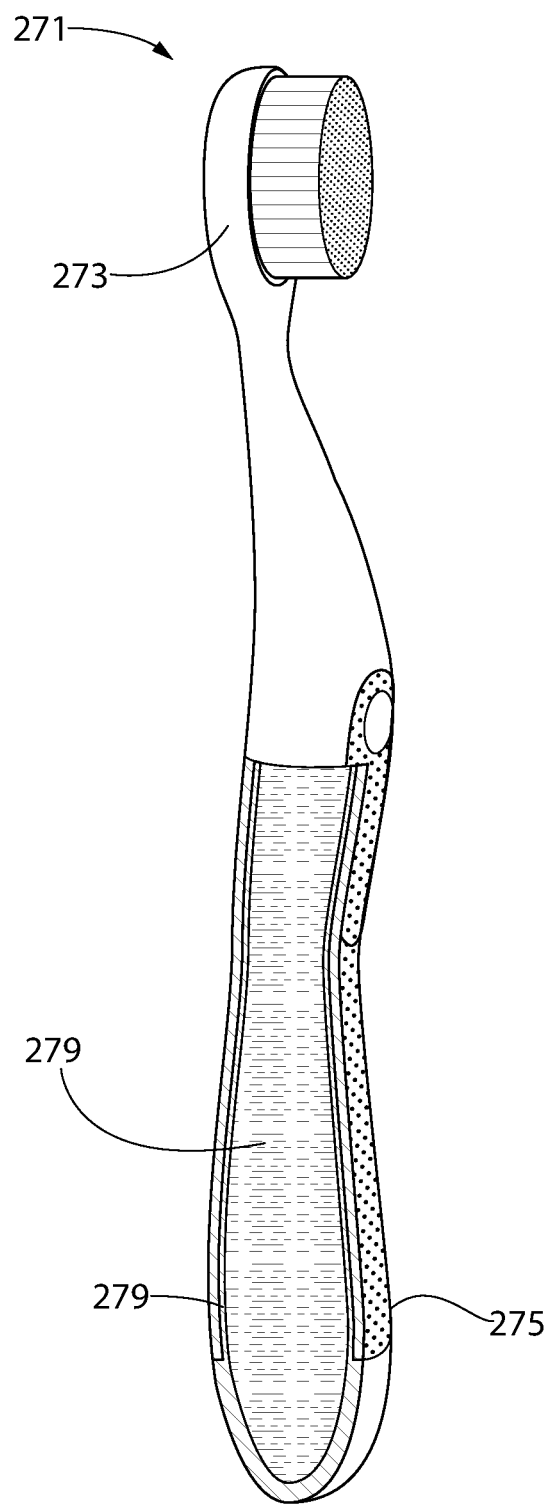
FIG. 7 illustrates a toothbrush having a chamber containing an oral care additive.

A toothbrush 271 having at least one physical property is illustrated in FIG. 7. This toothbrush 271 includes a head 273 coupled to a handle 275, and the handle 275 includes cavity 277 from which an oral care additive 279 may be dispensed for use during a brushing session. The manner in which the oral care additive 279 is dispensed is not limiting of the invention. The toothbrush 271 may include indicia, an RFID tag, an identifying feature, or the like, which is indicative of the presence of the oral care additive 279. When the user prepares to perform a brushing routine, the data processing unit 105 may receive the physical property data as input from the user, using the camera 177, using the RFID tag reader 179, or any other input method, such that the physical property data reflects the presence of the oral care additive 279.

Figure 8:
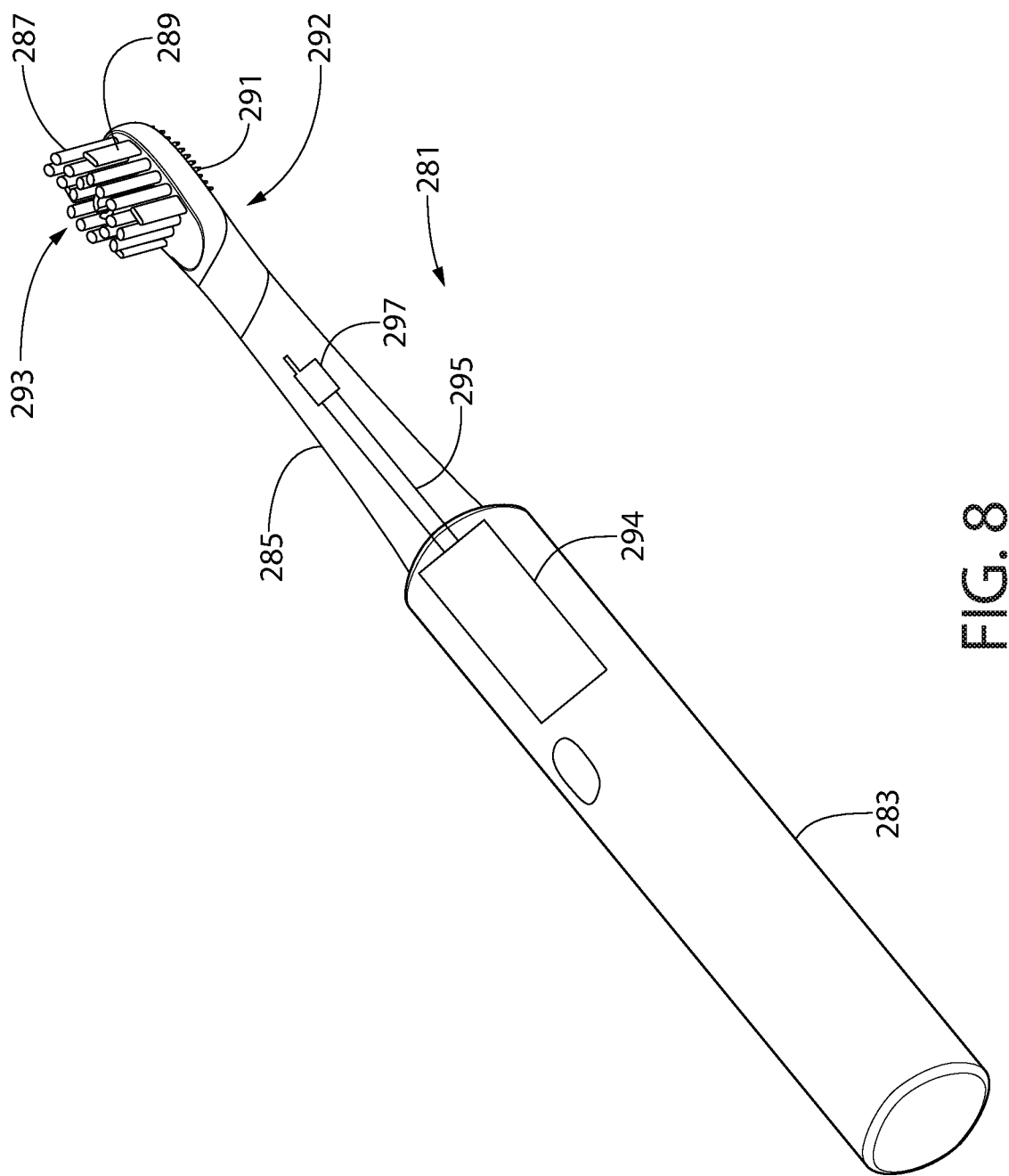
FIG. 8 illustrates an electronic toothbrush having a detachable head.

An electric toothbrush 281 is illustrated in FIG. 8. The electric toothbrush 281 includes a handle 283 and a refill head 285. In certain embodiments, the handle 283 and the refill head 285 are removably coupled to each other. In certain embodiments, the at least one physical property is associated with the refill head 285. The at least one physical property associated with the refill head 285 may be, for example, the bristle hardness, the bristle pattern, the bristle profile, the type of teeth cleaning element or elements, the head size, the presence of an elastomeric element in the bristle field, the presence of a tongue cleaner, and the like. In certain embodiments, the at least one physical property is associated with the handle 283, such as the presence of an electrically-powered vibratory element. In certain embodiments of electric toothbrushes, the control circuit 165 of the data processing unit 105 may reside at least partially within the handle 283. Alternatively, the handle 283 may include a separate toothbrush control circuit which controls the electric toothbrush and communicates with the data processing unit 105.

In this embodiment of electric toothbrush, the refill head 285 includes a bristle field 287 which includes at least one elastomeric element 289 and a tongue cleaner 291 on the back side 292 of the refill head 285. In addition, the bristle field 287 has a bristle profile 293 formed by having bristles of differing lengths. Any one or more of the presence of the at least one elastomeric element 289 in the bristle field 287, the presence of the tongue cleaner 291, and the bristle profile 293 may be reflected in the physical property data. Also in this embodiment, shown schematically, the handle includes a motor 294 operably coupled to a shaft 295, with an eccentric mass 297 positioned at the distal end of the shaft 295. In combination, the motor 294, the shaft 295, and the eccentric mass 297 form an electrically-powered vibratory element, the presence of which may be reflected in the physical property data. In addition, the physical property data associated with the electric toothbrush 281 may reflect any one or more physical properties of one or both of the handle 283 and the head 285.

Figure 9:
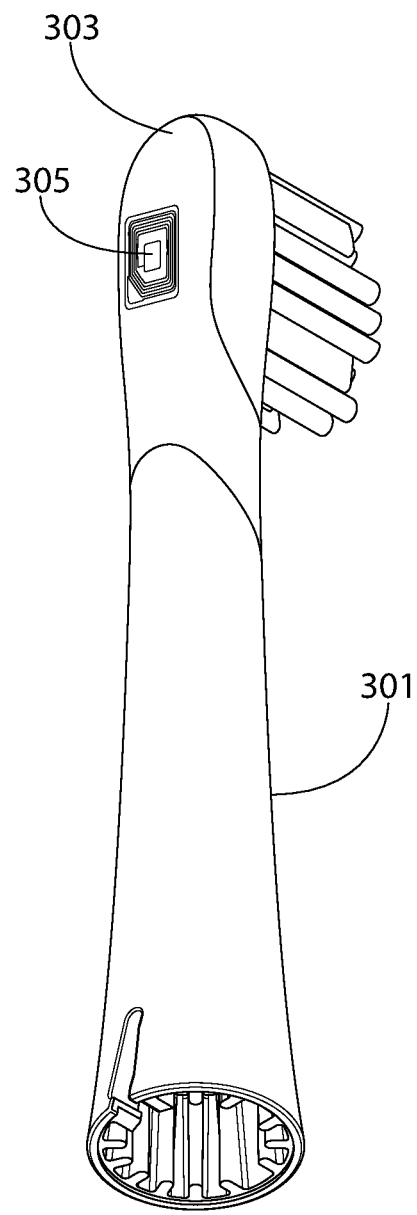
FIG. 9 illustrates a detachable head for an electronic toothbrush including an RFID tag.

A refill head 301 having at least one physical property is illustrated in FIG. 9. The refill head 301 may be removably coupled to a handle as shown in FIG. 8. The at least one physical property may be, for example, the bristle hardness, the bristle pattern, the bristle profile, the type of teeth cleaning element or elements, the head size of the toothbrush, and the like. As shown, the refill head 301 includes an RFID tag 305 positioned on the back side 303 of the head 301. In the same manner discussed above, the RFID tag 305 may be detected and by an RFID tag reader 179 included as part of the data processing device 105 so that the physical property data will be indicative of the at least one physical property of the refill head 301.

Figure 10:
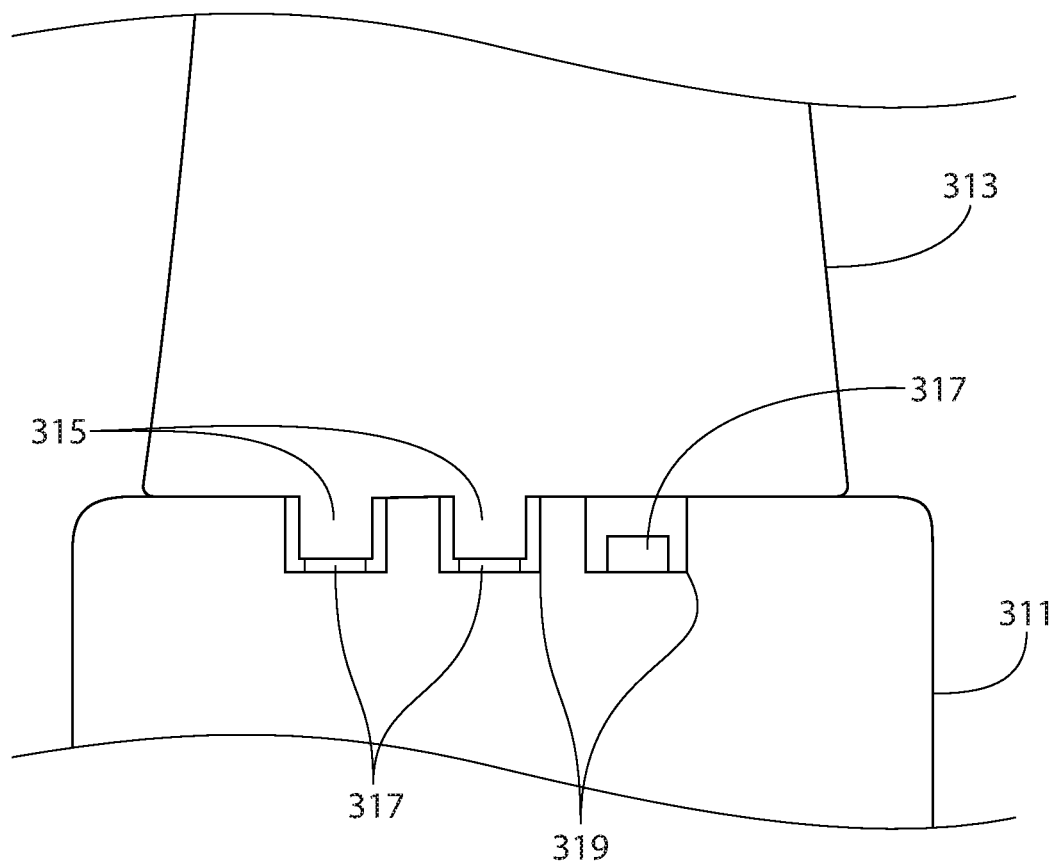
FIG. 10 illustrates an interface between the head and the handle of an electronic toothbrush.

Portions of a handle 311 coupled to a refill head 313 for an electric toothbrush are illustrated in FIG. 10. The handle 311 and the refill head 313 include a physical interface which is used to help generate the physical property data. The refill head 313 includes at least one physical property which may have an impact on the effectiveness of a brushing routine. In this embodiment of electric toothbrush, the control circuit 165 of the data processing unit 105 may reside at least partially within the handle 311. Alternatively, the handle 311 may include a separate toothbrush control circuit which controls the electric toothbrush and communicates with the data processing unit 105. The combination of the refill head 313 coupled to the handle 311 provides a selection mechanism which may be used to identify the refill head 313, and from this identification the data processing unit 105 may obtain the physical property data. In certain embodiments, the selection mechanism may directly identify the at least one physical property of the refill head 313. In other embodiments, the selection mechanism may identify the refill head 313, and from identification of the refill head 313, the data processing unit 105 may obtain the physical property data. In both types of embodiments, the physical property data will be indicative of the at least one physical property of the refill head 313.

As part of the selection mechanism, the refill head 313 includes a plurality of selection indicator features 315, which are shown as a plurality of teeth, and the handle 311 includes a plurality of selection identifiers 317, which are shown as a plurality of switches. Each selection identifier 317 is located within one of a plurality of receptacles 319, each of which is formed to receive one of the selection indicator features 315. Each selection identifier 317 helps the data processing unit 105 determine which, if any, of the selection identifiers 317 of the handle 311 are interacting with one of the selection indicator features 315 of the refill head 313 when the refill head 313 is coupled to the handle 311. By identifying which of the selection identifiers 317 are interacting with the selection indicator features 315, the data processing unit 105 can either identify the refill head 313, and with identification of the refill head obtain the physical property data, or directly receive the physical property data of the refill head 313.

Figure 11:
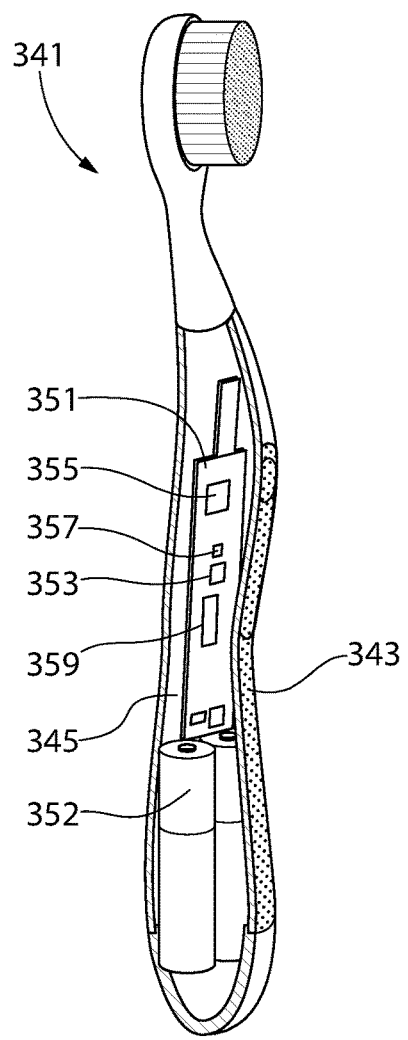
FIG. 11 illustrates a partial sectional view of a toothbrush having electronic circuitry for collecting brushing session data.

FIG. 11 illustrates a toothbrush 341 which includes at least one physical property which may have an impact on the effectiveness of a brushing routine. The at least one physical property may be the bristle hardness, the bristle pattern, the bristle profile, the type of teeth cleaning element or elements, the angle of the head with respect to the handle, the flexibility of the material from which all or a part of the toothbrush is constructed, the head size of the toothbrush, the size of the handle, the presence of an elastomeric element in the bristle field, the presence of a tongue cleaner, the mobility of the head of the toothbrush with respect to a handle of the toothbrush, the mobility of a first portion of the head with respect to a second, different portion of the head, and the like. The handle 343 of the toothbrush 341 forms a housing for containing electronic circuitry 351 for collecting brushing session data. The handle 343 is a hollow structure in which a cavity 345 is formed. The electronic circuitry 351, which includes a power source 352, is located within the cavity. The electronic circuitry 351 may be used to collect and analyze brushing session data from which an evaluation of the brushing session may be made. In certain embodiments, the evaluation of the brushing session may be based at least in part upon the physical property data.

Figure 12:
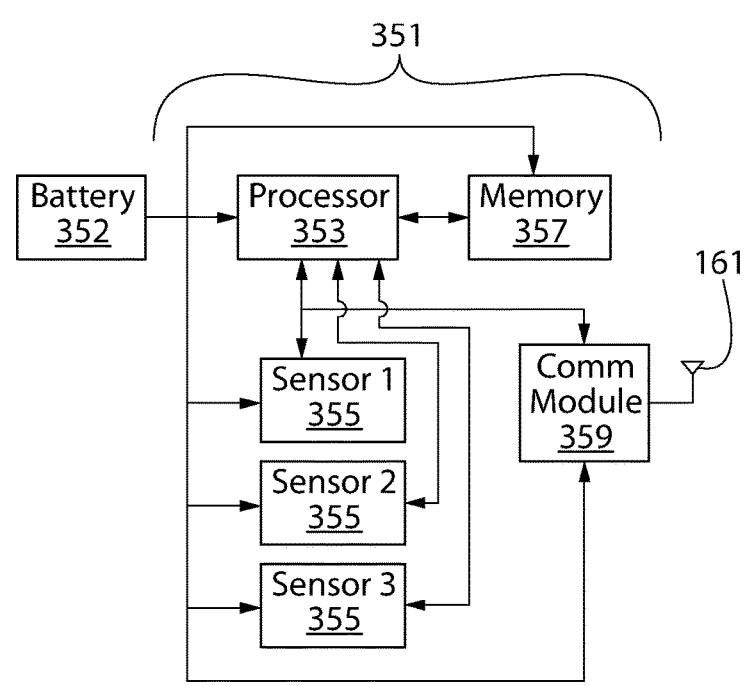
FIG. 12 schematically illustrates electronic components of the toothbrush of FIG. 11.

A schematic version of the electronic circuitry 351 is shown in FIG. 12. The electronic circuitry 351 includes a processor 353 communicably coupled to sensors 355, a memory 357, and a communication module 359. The number of sensors 355 included as part of the electronic circuitry 351 depends upon the type of brushing session data to be detected and the functionality of each type of sensor employed. The brushing session data that is detected and collected may include position, motion, acceleration, frequency, and pressure against the surface of the teeth. Other types of brushing session data associated with a brushing session may also be detected and collected, and those listed herein are not to be limiting of the invention unless otherwise indicated in the claims. In certain embodiments, only one sensor 355 may be included as part of the electronic circuitry 351, and in other embodiments, two or more sensors 355 may be included. By way of example, the at least one sensor 355 may be any one or more of the following: a 3-axis accelerometer, a 6-axis accelerometer, a gyroscope, a magnetometer, a pressure sensor, among other types of sensors. In general, each sensor 355 included as part of the electronic circuitry 351 generates at least part of the brushing session data. For purposes of the present disclosure, the term "brushing session data" is any type of information which may be extracted or derived from a sensor or sensor signal, regardless of the form of the extracted information. By way of example, brushing session data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 353 and the memory 357 may be omitted from the electronic circuitry 351 of the toothbrush 341. In such embodiments, the sensors 355 may communicate brushing session data directly to the communication module for transmission.

The memory 357 may be any appropriate type of memory or storage which enables the processor 353 to perform the desired programming, such as volatile and/or non-volatile random access memory, or any other type of storage. The particular type of storage used for the memory 357 is not to be limiting of the invention. The communication module 359 in the exemplary embodiment includes an antenna 361 to enable wireless communication. The communication module 359 may be configured and/or programmed to communicate using a wireless technology standard such as Wi-Fi, Bluetooth®, and the like, or it may communicate using any type of proprietary wireless transmission protocol. In certain embodiments, the communication module 359 may include a port to enable communications using wires and wired protocols, such as USB and the like. The particular mode of communication used by the communication module is not limiting of the invention unless specifically set forth in a claim.

Figure 13:
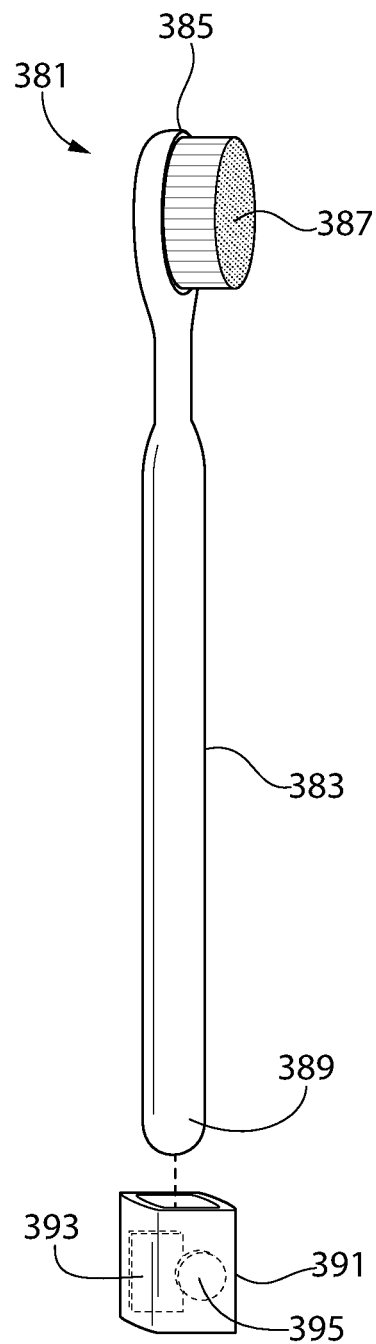
FIG. 13 illustrates a toothbrush and a dongle, the dongle having electronic circuitry for collecting brushing session data.

FIG. 13 illustrates another toothbrush 381 which may be used with a dongle 391 to detect and collect brushing session data. The toothbrush 381 also includes at least one physical property which may have an impact on the effectiveness of a brushing routine. The at least one physical property may be the bristle hardness, the bristle pattern, the bristle profile, the type of teeth cleaning element or elements, the angle of the head with respect to the handle, the flexibility of the material from which all or a part of the toothbrush is constructed, the head size of the toothbrush, the size of the handle, the presence of an elastomeric element in the bristle field, the presence of a tongue cleaner, the mobility of the head of the toothbrush with respect to a handle of the toothbrush, and the like. Generally, the toothbrush 381 includes a handle 383 and a head 385 to which a plurality of teeth cleaning elements 387 are affixed. The dongle 391 may be removably affixed to the proximal end 389 of the handle 383. The dongle 391 comprises a housing for containing electronic circuitry 393 and an associated a power source 395, which may be similar to that described above in connection with FIG. 12.

The brushing session data which is detected and collected by the toothbrush embodiments shown in FIGS. 11 and 13 may include a side-to-side linear brush stroke motion, an up and down linear brush stroke motion, a circular brush stroke motion, a flicking brush stroke motion, a brush stroke rate, and a pressure of the head of the toothbrush on the teeth, amongst others. During use, the brushing session data is generated during at least a portion of the brushing session. The brushing session data may be used to evaluate the brushing session by calculating one or more performance metrics, and the performance metric may represent brushing efficacy during one or more portions of the brushing session. The performance metric may express the efficacy of a brushing session, or even for portions of a brushing session, as a single number, and stored in the memory 171 of the data processing unit 105 for later use. In certain embodiments, the data processing device 105 may transmit the calculated performance metrics to the server 107 for storage and or additional analysis. In certain embodiments, a base performance metric may be weighted, using one or more of the physical properties of the toothbrush used during the brushing session from which the data underlying the performance metric was obtained, to calculate a weighted performance metric. For example, when a user brushes their teeth using a toothbrush with a large head, the performance metric may be given a greater weight as compared to when a toothbrush with a smaller head is used. Similarly, when a user brushes their teeth using a toothbrush which dispenses an oral care additive, the performance metric may be given a greater weight as compared to when a toothbrush is used that does not dispense an oral care additive. The weights given to the different physical properties may vary by the type of physical property and the amount it is determined that physical property improves or decreases the efficacy of a user's brushing routine.

In certain embodiments, the performance metrics which are stored in the memory 171 of the data processing unit 105 or on the server 107 may be used during future brushing sessions to aid in determining what brushing routine to suggest to the user. For example, in the context of the process shown in the flowchart 221 of FIG. 3A, performance metrics may be used in combination with the physical property data to help determine the target brushing time for a brushing routine. Also, in embodiments in which performance metrics are stored, the performance metrics may be analyzed by machine learning processes, and the machine learning may be used to enhance future brushing routines.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care system comprising:
a toothbrush comprising a physical property; and
a programmable processor configured to:
receive physical property data indicative of the physical property of the toothbrush obtained by reading visible indicia associated with the toothbrush; and
determine at least one of a suggested brushing time and an evaluation of a brushing session;
wherein determining the evaluation comprises weighting a base performance metric using the physical property data to obtain a weighted performance metric and wherein determining the suggested brushing time comprises adding an offset time to a standard brushing time, the offset time based at least in part upon the physical property data;
wherein the toothbrush comprises the indicia, the indicia comprising the physical property data; and
wherein the indicia comprises a coded image.

2. An oral care system comprising:
a toothbrush comprising a physical property; and
a programmable processor configured to:
receive physical property data indicative of the physical property of the toothbrush obtained by reading visible indicia or an identifier associated with the toothbrush; and
determine at least one of a suggested brushing time and an evaluation of a brushing session;
wherein determining the evaluation comprises weighting a base performance metric using the physical property data to obtain a weighted performance metric and wherein determining the suggested brushing time comprises adding an offset time to a standard brushing time, the offset time based at least in part upon the physical property data;
further comprising a radio frequency identifier (RFID) tag reader operably coupled to the programmable processor;
the toothbrush comprising a radio frequency identifier (RFID) tag; and
wherein the physical property data is received by the RFID tag reader from the RFID tag.

3. The oral care system according to claim 1, the toothbrush comprising:
a handle; and
a head removably coupled to the handle; and
wherein the head comprises the physical property.

4. The oral care system according to claim 1 further comprising a data processing unit, the data processing unit comprising the programmable processor.

5. The oral care system according to claim 1 wherein the physical property consists of one of a bristle hardness of the toothbrush, a bristle pattern of the toothbrush, a bristle profile of the toothbrush, a head size of the toothbrush, a presence of an electrically-powered vibratory element, a presence of an oral care additive, a presence of a tongue cleaner, a presence of an elastomeric element in a bristle field, and a mobility of a first portion of the toothbrush with respect to a second, different portion of the toothbrush.

6. An oral care method comprising:
a) receiving, by a programmable processor, physical property data indicative of a physical property of a toothbrush obtained by reading visible indicia associated with the toothbrush; and
b) determining, by the programmable processor, a suggested brushing time;
wherein determining the suggested brushing time comprises adding an offset time to a standard brushing time, the offset time based at least in part upon the physical property data;
wherein the toothbrush comprises the indicia, the indicia comprising the physical property data;
wherein the indicia comprises a coded image.

7. The oral care method according to claim 6 further comprising determining, by the programmable processor, an evaluation of a brushing session based at least in part upon the physical property data.

8. An oral care method comprising:
a) receiving, by a programmable processor, physical property data indicative of a physical property of a toothbrush obtained by reading visible indicia associated with the toothbrush; and
b) determining, by the programmable processor, a suggested brushing time;
wherein determining the suggested brushing time comprises adding an offset time to a standard brushing time, the offset time based at least in part upon the physical property data;
wherein step a) further comprises providing a packaging material for the toothbrush, wherein the packaging material comprises the indicia, the indicia comprising the physical property data, the indicia comprising a coded image.

* * * * *